United States Patent
Lindahl et al.

(10) Patent No.: US 10,713,844 B2
(45) Date of Patent: Jul. 14, 2020

(54) RENDERING BASED GENERATION OF OCCLUSION CULLING MODELS

(71) Applicant: DONYA LABS AB, Linköping (SE)

(72) Inventors: Ulrik Lindahl, Ljungsbro (SE); Gustaf Johansson, Linköping (SE)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/537,884

(22) PCT Filed: Dec. 18, 2015

(86) PCT No.: PCT/EP2015/080664
§ 371 (c)(1),
(2) Date: Jun. 19, 2017

(87) PCT Pub. No.: WO2016/097373
PCT Pub. Date: Jun. 23, 2016

(65) Prior Publication Data
US 2017/0358127 A1    Dec. 14, 2017

(30) Foreign Application Priority Data
Dec. 19, 2014 (EP) .................................. 14199427

(51) Int. Cl.
*G06T 17/10* (2006.01)
*G06T 15/00* (2011.01)
(Continued)

(52) U.S. Cl.
CPC .............. *G06T 17/10* (2013.01); *G06T 7/564* (2017.01); *G06T 15/00* (2013.01); *G06T 17/00* (2013.01);
(Continued)

(58) Field of Classification Search
CPC ......... G06T 7/564; G06T 15/00; G06T 15/40; G06T 17/00; G06T 17/005; G06T 17/10; G06T 17/20; G06T 19/20; G06T 2210/12
See application file for complete search history.

(56) References Cited

U.S. PATENT DOCUMENTS 6,587,104 B1 * 7/2003 Hoppe .................... G06T 17/20
345/423
6,694,163 B1 * 2/2004 Vining .................... G06T 17/00
128/920

(Continued)

OTHER PUBLICATIONS

Fei, Yun, Bin Wang, and Jiating Chen. "Point-tessellated voxelization." Proceedings of Graphics Interface 2012. Canadian Information Processing Society, 2012.*

(Continued)

*Primary Examiner* — Diane M Wills

(57) ABSTRACT

A method and image processing apparatus for creating simplified representations of an existing virtual 3D model for use in occlusion culling is provided. A visual hull construction is performed on the existing virtual 3D model using an approximate voxel volume consisting of a plurality of voxels. A set of projections from a plurality of viewing angles provide a visual hull of the existing 3D model. The volumetric size of the visual hull of the existing 3D model is increased to envelop the existing virtual 3D model to provide the visual hull as an occludee model, and the volumetric size of the visual hull of the existing 3D model is decreased to be enveloped by the existing virtual 3D model to provide the visual hull as an occluder model. The occludee model and the occluder model are used during runtime in a 3D virtual environment for occlusion culling.

20 Claims, 4 Drawing Sheets

(51) Int. Cl.
  *G06T 17/00* (2006.01)
  *G06T 7/564* (2017.01)
  *G06T 17/20* (2006.01)
  *G06T 15/40* (2011.01)
(52) U.S. Cl.
  CPC .............. *G06T 17/20* (2013.01); *G06T 15/40* (2013.01); *G06T 17/005* (2013.01); *G06T 2210/12* (2013.01)

(56) References Cited

U.S. PATENT DOCUMENTS

| | | | |
|---|---|---|---|
| 2002/0150288 A1* | 10/2002 | Fujiwara | G06T 17/10 382/154 |
| 2013/0141521 A1* | 6/2013 | Williams | H04N 7/00 348/36 |
| 2014/0267266 A1* | 9/2014 | Crassin | G06T 15/08 345/424 |

OTHER PUBLICATIONS

Schaufler, Gernot, et al. "Conservative Volumetric Visibility with Occluder Fusion." Proceedings of the 27th Annual Conference on Computer Graphics and Interactive Techniques. New York: ACM Press/Wesley Publishing Co., 2000. 229-38.*

Eisemann et al., "Single-pass GPU Solid Voxelization and Applications", GI '08: Proceedings of Graphics Interface 2008, May 2008, pp. 73-80. (Year: 2008).*

* cited by examiner

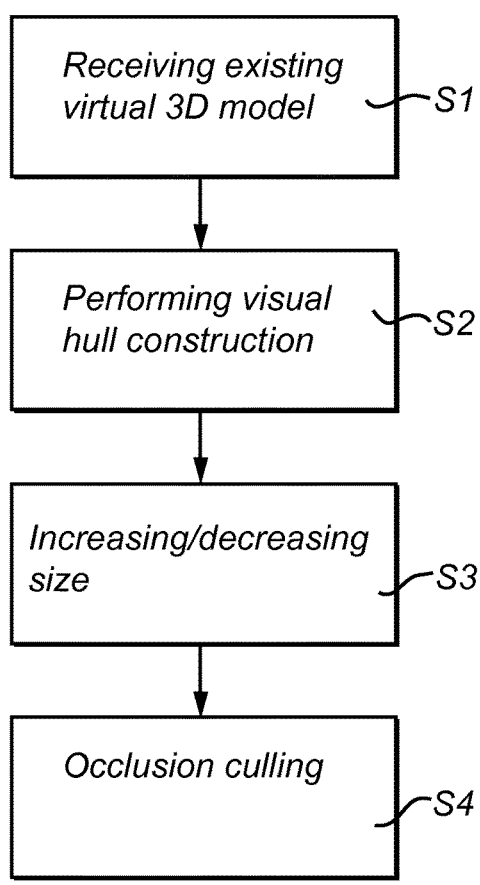
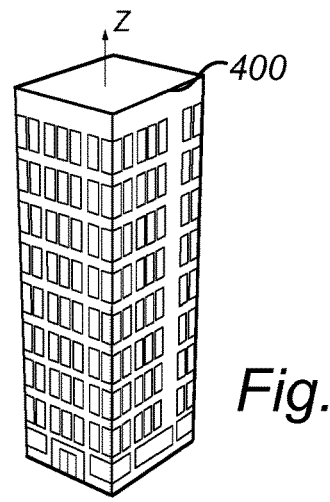
*Fig. 4a*
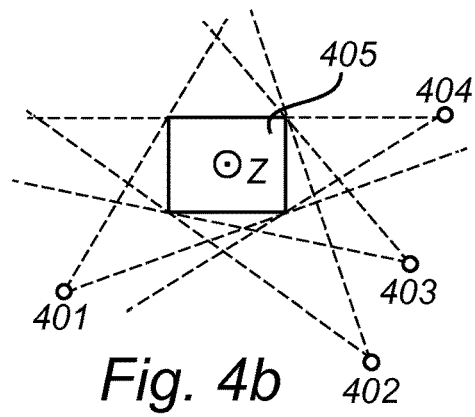
*Fig. 4b*
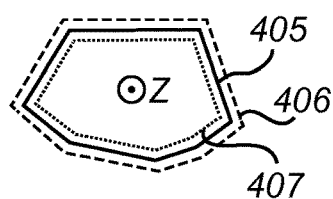
*Fig. 4c*
*Fig. 3*
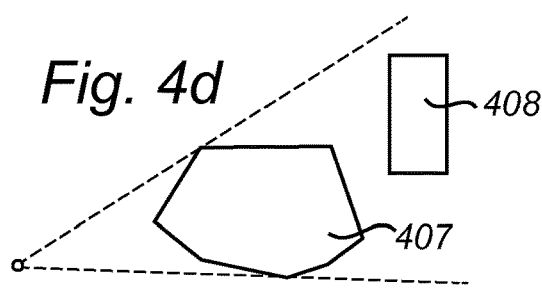
*Fig. 4d*
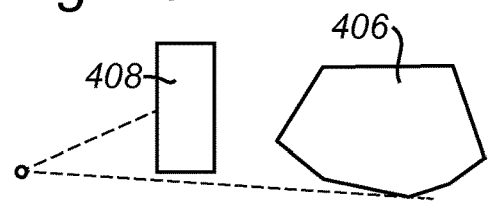
*Fig. 4e*

RENDERING BASED GENERATION OF OCCLUSION CULLING MODELS

TECHNICAL FIELD

The present invention generally relates to computer graphics and more particularly to a method and system for creating simplified representations of existing virtual 3D models for use in occlusion culling.

BACKGROUND OF THE INVENTION

Creation and visualization of computer graphics takes an ever increasing importance in diverse fields of computing such as computer aided design (CAD), architectural walk-throughs, simulations, medical visualization and computer games. The visualization of computer graphics also often requires that interaction with the model takes place at an interactive frequency of greater than 10 frames per second.

A common trend for computer graphics is the increasing amount of complexity and therefore size of the computer graphic models. The initial 3D models are computationally very expensive and thus require specialized graphics systems to handle, furthermore they are generally never able to be handled interactively. The development of computer hardware is not likely to provide interactive handling of those 3D models since the size of the computer graphics and the size of the secondary computer memory is increasing at faster rates than the development of thereto related hardware. 3D models are with few exceptions represented using polygonal meshes. These meshes are typically not optimized for display or simulation performance. In most applications, the initial meshes can usually be replaced by optimized simplified versions that are approximations with far fewer faces, or containing other properties that make them more suited for particular applications such as those mentioned earlier.

For example, a visual image that includes a large scene of a computer game, such as a building interior, a city, mountain, and the like, may involve millions of polygons that need to be drawn. Drawing such a large number of polygons may be a task that is beyond the capacity of many of today's computer hardware systems. One solution to this problem recognizes that usually only a small part of such a scene is actually visible. That is, many of the polygons that comprise the scene may be hidden or occluded by other polygons, or even too far from the viewpoint to be fully recognized.

For such a purpose and specifically in regards to complex polygon representations, there is a trend to manually create simplified representation resembling the complex polygon representations but introducing a lower computational cost for use in the determination process during polygon occlusion (often referred to as occlusion culling). By occlusion culling, where object which are hidden behind in other objects in the virtual scene are not put into the rendering pipeline, the amount of data which will be sent to the hardware is reduced. Hence, by such a process it is possible to further improve rendering of the scene. Moreover, to optimize the rendering of objects in virtual environments, shadows cast by object may often be calculated using the simplified representations due to the high detail level of the original virtual object.

However, the simplified versions are generally created manually by a graphical artist and their creation is labor intensive and the quality of the simplified version will depend on the skill of the artist. Hence, the manual creation of the simplified representations is a tedious process and slows down as well as increases the cost when e.g. producing a computer game or similar. In addition, the quality of the resulting simplified polygon representation is limited by the skill of the graphics artist. Accordingly, it would be desirable to allow for automation of the forming of a simplified representation, possibly being useful in an occlusion culling process.

SUMMARY OF THE INVENTION

With regards to the above-mentioned needs, it is a general object of the present invention to provide an efficient method and system for creating simplified representations of an existing virtual 3D model for use in occlusion culling.

The present invention is based on the inventor's realization that a visual hull construction using an existing virtual 3D model can be used to create simplified representations of the existing virtual 3D model from the visual hull. Increasing respectively decreasing the size of visual hull provides occludee models respectively occluder models which are suitable for use in occlusion culling during runtime in a 3D virtual environment. Further, the occludee and occluder models created according to the present invention are provided automatically in a quick, efficient and cost effective manner which may save both labor costs and time during production of such assets for a virtual environment.

According to a first aspect of the invention these and other objectives are at least partly achieved by a method for creating simplified representations of an existing virtual 3D model for use in occlusion culling. The method comprises receiving the existing virtual 3D model and performing visual hull construction on the existing virtual 3D model. The visual hull construction uses an approximate voxel volume consisting of a plurality of voxels and the voxel volume fully encloses the existing virtual 3D model and a set of projections from a plurality of viewing angles to provide a visual hull of the existing 3D model. The method further comprises increasing the volumetric size of the visual hull of the existing 3D model to envelop the existing virtual 3D model to provide the visual hull as an occludee model, and decreasing the volumetric size of the visual hull of the existing 3D model to be enveloped by the existing virtual 3D model to provide the visual hull as an occluder model. The occludee model and the occluder model are used during runtime in a 3D virtual environment for occlusion culling.

By means of the invention, it is possible to automate the formation of occludee and occluder models from an existing 3D model. Occlusion culling is a process that disables rendering of objects when they are not currently seen from a specific view-point in a virtual environment because they are obscured by other objects. In an occlusion culling process a model being larger than initial 3D model may be provided as an "occludee", whereas a model being smaller than the initial 3D model may be provided as an "occluder". The occludee is used to determine if the initial 3D model is hidden by another model during runtime, and similarly the occluder is used to determine if the initial 3D object occludes another model. Thereby, the occlusion culling process efficiently reduces the need for hardware as occluded object are not put in the rendering pipeline. Through the invention, the occludee is guaranteed to be larger than the initial 3D model, and likewise the occluder is guaranteed to be smaller than the initial 3D model. Further, the simplified models provided through the invention leads to a more computationally efficient occlusion culling which improves the throughput in the rendering pipeline. An advantage with the invention is thus that there is no need for a graphical artist to manually produce these models. Thereby, both costs and time can be saved for producing the occludee and occluder models.

Visual hull construction is a technique for separating a foreground object in an image from the background and is known to the skilled person. In visual hull construction the image is divided into a foreground and background image. The foreground image, known as a silhouette, is the 2D projection of the corresponding 3D object. The silhouette together with the camera parameters such as the viewing angle defines a back-projected generalized cone that contains the actual object. This cone is called a silhouette cone. An intersection a plurality of silhouette cones is called a visual hull. Hence, portions of the visual hull will in specific configurations of the camera parameters tangent the original 3D object, e.g. when the viewing angle result in a silhouette cone which tangents a polygon of the existing 3D model. However, most often the visual hull will be larger than the original 3D object. Thereby, the inventors realized that visual hull construction may be suitable to provide at least occludee models to be used in occlusion culling.

The present invention should in at least one aspect be construed as a computer implemented method which may be executed on any general type processor or alternatively on a more specialized type of processor or computing unit such as e.g. a graphical processing unit (GPU). The expression receiving the existing virtual 3D model should in this context be interpreted broadly as a user uploading, loading, providing or inputting an existing 3D model. The existing 3D model may be represented by any suitable 3D data format such as NURBS, polygonal meshes, point clouds or octrees. The present invention may thus be embodied by a non-transitory computer readable medium storing one or more computer program product that when executed on a processor performs the invention in accordance with the first aspect.

In one embodiment of the invention, increasing the volumetric size of the visual hull may comprise adding at least one outer layer of voxels to the visual hull to provide the occludee model, and decreasing the volumetric size may comprise removing at least one outer layer of voxels from the visual hull to provide the occluder model. An identification of the outer layer of voxels, i.e. voxels not being surrounded at all side by other voxels is an efficient and computationally cost effective process. Thereby, adding or removing an outer layer of voxels provides an efficient step to increase or decrease the volumetric size.

It should be noted that the addition or removal of an outer layer is generally be performed equally over the (entire) visual hull. However, in another embodiment of the invention the method may further comprise an additional step of adding or removing a limited layer of voxels to from the visual hull, where the limited layer is limited to predetermined portions of the visual hull. Such predetermined portions could be portions of the visual hull where removal of the layer of voxels would remove a portion of the visual hull. Likewise, a certain portion of the visual hull may be less sensitive to addition of a layer of voxels and can thereby be subjected to such an additional step. The specifying of such portions of the visual hull can be provided automatically by calculating which portions are sensitive to removal of voxels, or manually by a user providing a selection of important portions of the existing 3D model which should be allowed less modification during the visual hull construction.

In another embodiment of the invention, the visual hull may be converted into a polygonal mesh representation prior to the steps of increasing and decreasing the size. Increasing the volumetric size of the visual hull may then comprise resizing the polygonal mesh representation of the visual hull. This feature and the advantages, are similar to another invention by the same inventors and applicant, and disclosed in U.S. application Ser. No. 13/708,231 which is hereby incorporated in entirety by reference.

An alternative solution based on the same inventive concept which also at least partly achieves the objectives, is a method for creating simplified representations of an existing virtual 3D model for use in occlusion culling. The method comprises receiving the existing virtual 3D model and performing visual hull construction on the existing virtual 3D model. The visual hull construction comprises providing an approximate voxel volume consisting of a plurality of voxels, the voxel volume fully enclosing the existing virtual 3D model, and providing a first set of projections of the existing virtual 3D model from a plurality of viewing angles and providing a second set of projections of the existing virtual 3D model from the plurality of viewing angles. The visual hull construction further comprises adding at least one layer of pixels to the outer border of each projection in the first set of projections, and removing at least one layer of pixels from the outer border of each projection in the second set of projections. The visual hull construction further comprises using the first set of projections and the approximate voxel volume to provide a first visual hull of the existing 3D model as an occludee model, and using the second set of projections and the approximate voxel volume to provide a second visual hull of the existing 3D model as an occluder model. The occludee model and the occluder model are used during runtime in a 3D virtual environment for occlusion culling.

The alternative solution thus increases respectively decreases the size of the projections within the sets of projections in order to provide an occludee model which is guaranteed to be larger, respectively an occluder model which is guaranteed to be smaller than the existing 3D model. In other words the steps of increasing and decreasing the volumetric size have been included in the visual hull construction rather than being performed on the resulting visual hull. Thus, it is the foreground image the 2D projection, which is increased respectively decreased in size in the alternative solution. Further features of the alternative solution are similar to the features mentioned above, for example an additional step where the addition or removal of pixels from each projection can be limited to predetermined portions of each projection.

Modifying the projections, i.e. silhouettes, by expanding them during a visual hull construction has been disclosed before, such as e.g. UK patent application GB 2458305A. However, in UK patent application GB 2458305A the silhouettes are expanded to increase the likelihood of individual voxels being included in the generated model such that the robustness to errors is improved. Further, GB 2458305A does not disclose any reduction of the projections.

The plurality of viewing angles used to perform the visual hull construction provides a plurality of silhouette cones which defines the visual hull. In general the more silhouette cones provided from the more (differing) viewing angles provides a better fidelity to the original 3D object. However, as is also appreciated, each viewing angle and silhouette cone will also increase the computational cost to form the visual hull. Hence, the number of viewing angles used may be determined by the user according to the desired fidelity of the models later on. For instance, a user which desires to use a simple model, e.g. a building, in a city scene for occlusion culling may use fewer viewing angles to provide the visual hull. Conversely, a user having a higher demand on fidelity or using a more complex initial model may use more viewing angles.

In one example the plurality of viewing angles may be uniformly spaced apart by a predetermined repetition distance around the existing virtual 3D model. To either ensure that a large enough number of viewing angles are used to capture openings in the existing virtual 3D model, and/or that the viewing angles are spaced apart with a sufficiently small repetition distance, at least one opening of the existing virtual 3D model may define an angular range in which a viewing angle results in a view through the at least one opening, and the predetermined repetition distance of the plurality of viewing angles may be selected to provide at least one viewing angle within the angular range. In other words, through-going openings in the existing virtual 3D model are identified and the viewing angles are spaced apart with a small enough repetition distance that the visual hull construction is ensured to comprise the openings in the existing virtual 3D model.

The accuracy i.e. fidelity of the visual hull may also be affected by the size of the voxels in the voxel volume during the visual hull construction. Therefore the size of the voxels in the voxel volume during the visual hull construction may be configured such that the view through the at least one opening corresponds to at least two voxels. Further, the accuracy may also be affected by the resolution of the initial rendering which limits the accuracy of each silhouette of the initial object and thereby the accuracy of the visual hull. Therefore, one way to control the accuracy is to allow a user to determine the resolution of the rendering of the existing 3D model during the visual hull construction in accordance with a desired accuracy of the occludee model and the occluder model. As is readily appreciated, the size of the voxels and the resolution of the initial rendering affect each other and may be interlinked. Accordingly, the resolution of the rendering may be configured such that a pixel of the rendering corresponds to at least one voxel. Thereby, the size of the voxels may be automatically determined to provide a suitable basis for the visual hull. Likewise, a configuration, such as a selection by a user of the size of the voxels may automatically determine the resolution of the initial rendering of the existing virtual 3D model.

In another embodiment of the present invention, the simplified representation i.e. the occludee and occluder models may also be used for shadow rendering during runtime in the 3D virtual environment. Shadow rendering typically does not require the computationally expensive existing 3D models but can often be calculated from simplified models. Therefore, at least one additional advantageous use of the models provided by the invention is shadow rendering. Likewise, the visual hull construction may further use a Z-buffer. The Z-buffer will provide depth data for the visual hull and hence recesses and depressions will also be modeled onto the visual hull. Thereby, even further uses are made possible for the occludee and occluder models such as e.g. in relation to physics-based simulations and calculations.

According to various embodiments of the invention, the method may also further comprise a step of converting the occludee model and the occluder model into a polygonal mesh representation. The conversion of the voxel based occludee and occluder models into a polygonal mesh representation may for example be performed with a marching cubes algorithm. Rendering engines using occlusion culling are typically configured to use models represented by polygon meshes, therefore the occlusion culling process may be more efficiently performed using an occludee model and an occluder model that is based on a polygonal mesh.

According to a second aspect of the invention, these and other objectives are at least also partly achieved by an image processing system for creating simplified representations of an existing virtual 3D model for use in occlusion culling. The image processing apparatus comprises means to receive the existing virtual 3D model means to perform a visual hull construction on the existing virtual 3D model using an approximate voxel volume consisting of a plurality of voxels, the voxel volume fully enclosing the existing virtual 3D model and a set of projections from a plurality of viewing angles to provide a visual hull of the existing 3D model means to increase the volumetric size of the visual hull of the existing 3D model to envelop the existing virtual 3D model to provide the visual hull as an occludee model means to decrease the volumetric size of the visual hull of the existing 3D model to be enveloped by the existing virtual 3D model to provide the visual hull as an occluder model and means to perform occlusion culling using the occludee model and the occluder model during runtime in a 3D virtual environment.

Effects and features of this second aspect of the present invention are largely analogous to those described above in connection with the first aspect of the invention.

The image processing system is preferably a server, a general computer, a micro processor or any other type of computing device. Similarly, the non-transitory computer readable medium may be any type of memory device, including one of a removable nonvolatile random access memory, a hard disk drive, a floppy disk, a CD-ROM, a DVD-ROM, a USB memory, an SD memory card, or a similar computer readable medium known in the art.

Further features of, and advantages with, the present invention will become apparent when studying the appended claims and the following description. The skilled addressee realize that different features of the present invention may be combined to create embodiments other than those described in the following, without departing from the scope of the present invention.

BRIEF DESCRIPTION OF THE DRAWINGS

The various aspects of the invention, including its particular features and advantages, will be readily understood from the following detailed description and the accompanying drawings, in which:

FIG. 3 shows a flowchart of method steps according to an embodiment of the invention;

FIG. 4a-e shows intermediate visualizations of the graphics objects generated at different steps of the method shown in FIG. 3;

DETAILED DESCRIPTION

Figure 1:
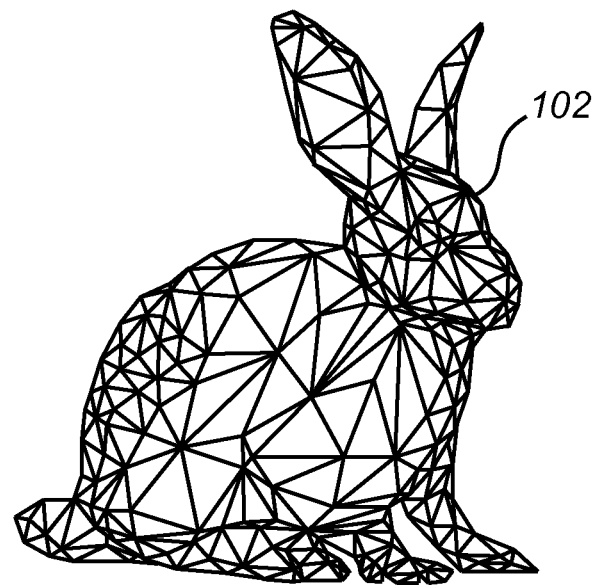
FIG. 1 shows an example of polygon based three-dimensional graphics image.

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled addressee. Like reference characters refer to like elements throughout.

The process of connecting three-dimensional vertices to form a representation of a graphical image may be referred to as creating a polygon mesh. FIG. 1 illustrates an exemplary three-dimensional graphics image, in the form of a "bunny", which have been tiled into such a polygon mesh. The bunny 102 is here represented by a large plurality of polygons. In a system with a 3D graphics accelerator, an application program generates three-dimensional geometry data 102 including information corresponding to points on the surface of a three-dimensional graphical image. These points are usable as vertices of polygons which, when connected, may be rendered to form a representation of the graphical image such as the "bunny" shown in FIG. 1. Typically, the application program transfers the three-dimensional geometry data to a graphics accelerator and renders the encoded polygons on a display e.g. a computer screen.

Figure 2:
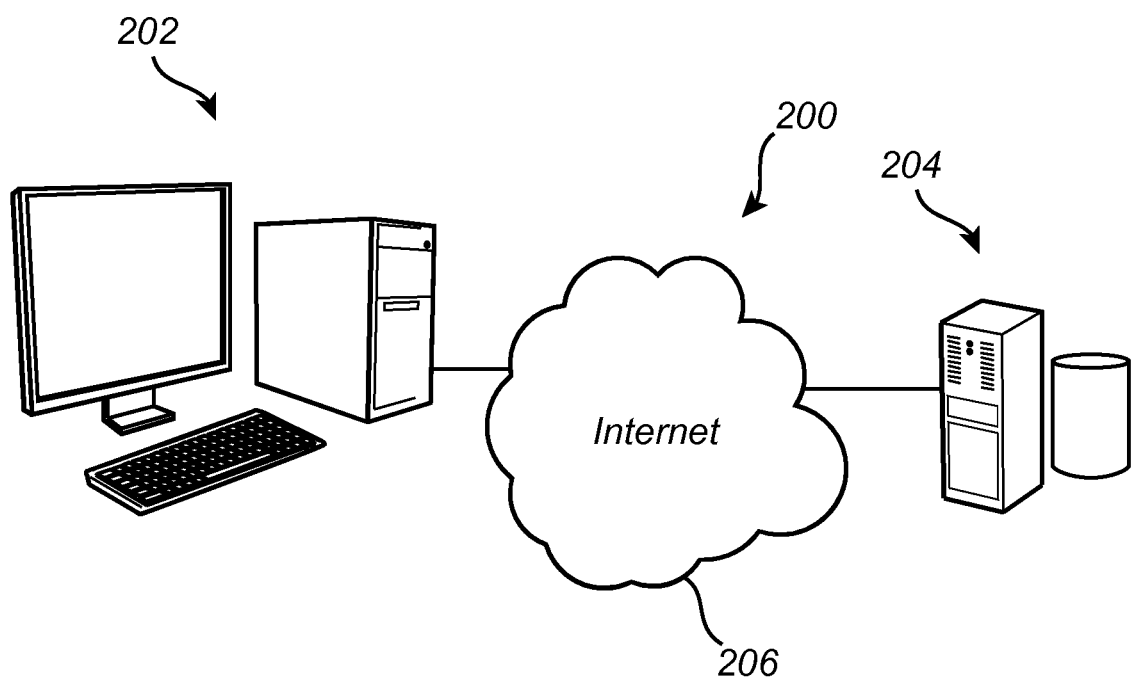
FIG. 2 illustrates a conceptual image processing system according to a currently preferred embodiment of the invention.

The general concept of the present invention may typically be implemented in a image processing system 200, such as the conceptual image processing system shown in FIG. 2, including a general purpose processor 202 e.g. a user controlled personal computer, an application specific processor, a circuit containing processing components, a group of distributed processing components, a group of distributed computers configured for processing, etc. The processor 202 may be or include any number of hardware components for conducting data or signal processing or for executing computer code stored in memory. The memory may be one or more devices for storing data and/or computer code for completing or facilitating the various methods described in the present description. The memory may include volatile memory or non-volatile memory. The memory may include database components, object code components, script components, or any other type of information structure for supporting the various activities of the present description. According to an exemplary embodiment, any distributed or local memory device may be utilized with the systems and methods of this description. According to an exemplary embodiment the memory is communicably connected to the processor 202 (e.g., via a circuit or any other wired, wireless, or network connection) and includes computer code for executing one or more processes described herein.

However, as is shown in the conceptual illustration in FIG. 2, the general functionality of the inventive image processing system 200 may also and/or alternatively be provided in a distributed environment, for example by means of a distributed image processing system 200. In such an implementation, the image processing system 200 may be configured to comprise a user controlled computing device 202 (e.g. the user controlled personal computer) connected to a server/database arrangement 204 over the Internet 206. Accordingly, resources for performing the inventive concept may typically be divided between the computing device 202 and the server/database arrangement 204.

Further to reducing the hardware constrains on the user controlled computing device 202, it would according to the invention be possible to e.g. "on-demand" provide a user/customer with the functionality provided by means of the inventive concept. As an example, a user wanting to generate a simplified representation of an existing virtual 3D model for occlusion culling may, through a user interface shown on the computing device 202, access a computer implementation of the method running on the server 204. Alternatively, the computing device 202 may be provided with software for producing the original image (such as for example 3D Studio Max, Maya, etc.), where the software running on the computing device 202 is adapted to access/interact with (by means of e.g. an API and "on-demand", as a subscription, as a fixed service, etc.) a computer implementation of the inventive concept running on the server 204.

Now referring to FIG. 3, the present invention is illustrated as a flowchart of steps in a method, and FIG. 4a-e in which intermediate visualizations of the virtual graphics objects obtained at each step of the method is schematically shown. The first step S1 comprises receiving an existing virtual 3D model 400, shown in FIG. 4a, by the computing device 202. As described above in connection with FIG. 2, the inventive concept can then further be performed on the 'local' computing device 202 or be performed remotely by one or several computing units 204 understood as e.g. a cloud implementation of the inventive concept. The z-axis of the 3D model 400 shown in FIG. 4a is also marked in order to relate to the subsequent illustrations.

In the next step S2 the 3D model 400 is subjected to a visual hull construction illustrated in FIG. 4b using a voxel volume (not shown) formed by a plurality of voxels fully enclosing the 3D model 400 and a plurality of viewing angles, herein shown as four viewing angles 401, 402, 403, 404. Note that to simplify understanding the 3D model 400 is illustrated in FIG. 4B in 2D with the z-axis shown. The process, e.g. the visual hull construction is however a 3D reconstruction and should not be construed as limited to two dimensions by the appended drawings. As shown in FIG. 4b each of the viewing angles 401, 402, 403, 404 provides a silhouette cone. Then, during the visual hull construction, voxels which do not form part of the silhouettes, i.e. the foreground images comprising the 2D projection of the original 3D object onto the voxel volume are removed from the plurality of voxels in the voxel volume. The resulting model 405, known as a visual hull 405 of the original 3D object 400 is the intersection of all the silhouette cones from the viewing angles 401, 402, 403, 404. The outline of the resulting visual hull 405 is shown in FIG. 4c. Note that due to the small number of viewing angles, in this case four, the visual hull 405 has an irregular shape compared to the original 3D model 400.

There are several factors which affect the accuracy of the visual hull 405. For example, the resolution of the 3D model 400 will determine how precisely the voxels can be removed during the visual hull construction. Likewise, the size of the voxels can also be set in order determine how precisely the voxels can be removed. Accordingly, the resolution of the rendering of the original 3D model 400 is usually set higher than the voxel size in order to provide a suitable basis for the visual hull 405. For example, the user can set the resolution, i.e. pixels provided by the rendering, such that a pixel will correspond to at least one voxel.

Further, the fidelity of the visual hull 405 to the 3D model 400 will depend on the number of viewing angles used to construct the visual hull 405. The visual hull 405 shown is constructed using only four viewing angles 401, 402, 403, 404 and is therefore not a precise match and differs in shape from the 3D model 400. By using more viewing angles a closer match and fidelity to the original model 400 may be achieved. Typically, on the order of hundreds of viewing angles can be used to provide a visual hull. Note that the viewing angles 401, 402, 403, 404 are spaced apart. During the visual hull construction the viewing angles 401, 402, 403, 404 can be spaced apart by e.g. a predetermined repetition distance around the 3D model 400. The repetition distance may be uniform in order to provide a non-biased view of the 3D model 400. It is also possible to provide more viewing angles from a specific side of the 3D model 400 to provide e.g. a view dependent visual hull.

In summary, the accuracy i.e. fidelity of the visual hull construction will depend on the number of viewing angles as well as the resolution of the rendering of the original 3D object 400, and the voxel size. The resolution and voxel size are interlinked and the skilled person realizes that each of them can be determined by the user, or automatically according to a criterions enabling a match between the two.

In the next step S3, the volumetric size of the visual hull 405 is increased to provide an occludee model 406, and decreased to provide an occluder model 407. The visual hull 405, the occludee model 406 illustrated by the dashed outline and the occluder model 407 illustrated by the dotted outline are shown in FIG. 4c. Note that the occludee model 406 is larger than the visual hull 405, and that the occluder model 407 is smaller than the visual hull 405. In order to increase or decrease the volumetric size, at least one outer layer of voxels is either added or removed from the visual hull 405. At least one layer means that there could be just one layer of voxels which is added or removed, but also that more than one layer can be added or removed such as three, five, ten or even more layers depending on the application. The voxels belonging to the outer layer can be identified e.g. through calculating which voxels are not surrounded on all sides by other voxels.

Further, some portions of the visual hull 405 can be of larger importance than others, such as e.g. portions of the visual hull 405 which would be removed through removing an outer layer of voxels. Likewise, a particular portion of the visual hull 405 can be more or less sensitive to addition of a layer of voxels and can thereby be subjected to such an additional step. The specifying of such portions, or limited layers, of the visual hull 405 can be provided automatically by a calculating which portions are sensitive to removal or addition of voxels, applying a weighting mask, or manually by a user marking important portions of the existing 3D model 400 which should not be removed.

In the next step S4 illustrated in FIG. 4d, the occludee model 407, which is smaller than the original object 400, is used in occlusion culling to determine if the original 3D model 400 would occlude another virtual object 408. Likewise as illustrated in FIG. 4e the occluder model 406, which is larger than the original object 400, is used to determine if the original object 400 would be occluded by another object 400. The occludee model 407 and occluder model 406 provided are guaranteed to be larger or smaller than the original 3D model 400 by the visual hull construction and the previous step S3 of addition or removal of layers. The occludee model 407 and occluder model 406 are used to determine if the original 3D model 400 is to be rendered or not during runtime in a 3D virtual environment. The 3D virtual environments where occlusion culling is used to reduce to rendering load are for example architectural walkthroughs, simulations, medical visualization and computer games. Note that in FIG. 4d the occluder model 407 which is smaller than the original 3D model 400 still occludes the other 3D object 408 and that object will therefore not be rendered. In FIG. 4e however, the occludee model 406 which is larger than the original 3D model 400 is not occluded by the other 3D object 408, and therefore the original 3D model 400 will be rendered.

The method can also further comprise a step of converting the occluder model 407 and occludee model 406 into polygonal mesh representation prior to the occlusion culling process. As an alternative (not shown) the visual hull 405 can also be converted into a polygonal mesh representation which is then resized, i.e. one instance resized larger and one instance resized smaller, and provided as an occludee model and a occluder model.

Figure 5:
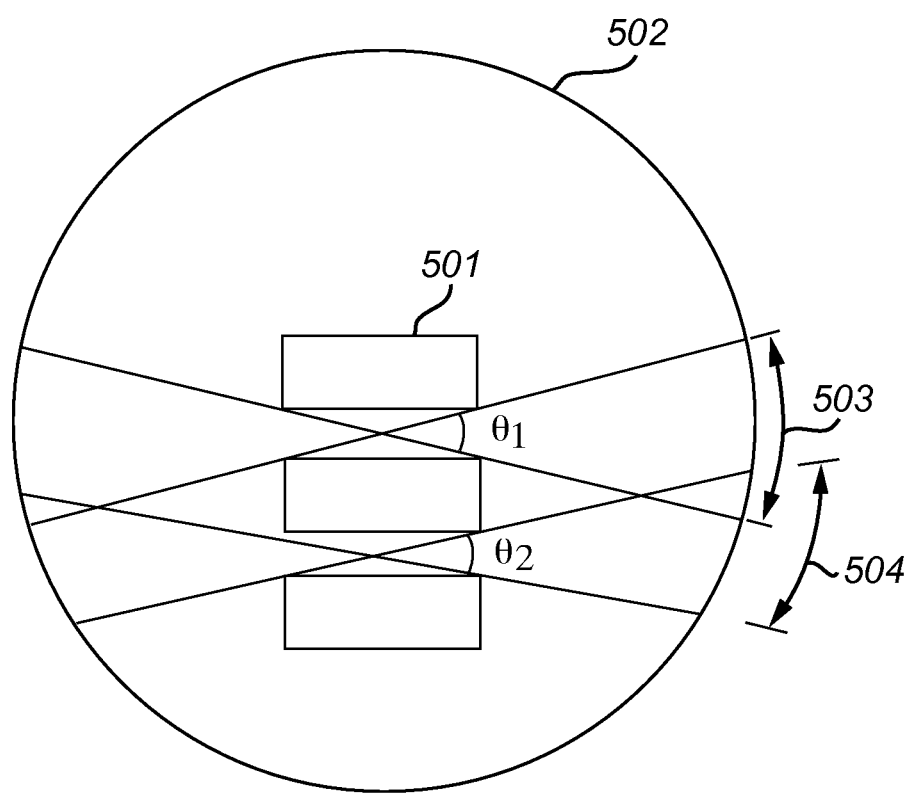
FIG. 5 schematically illustrates a step to configure a repetition distance of the viewing angles.

FIG. 5 illustrates a step of determining the repetition distance of the viewing angles used for the visual hull construction. The illustration is shown in 2D but is of course valid for the 3D case described. As described above, the plurality of viewing angles are typically spaced apart by a predetermined repetition distance around the 3D model 400. For example, the viewing angles may be spaced apart uniformly around the 3D model 400, or more viewing angles are placed on one or more specific sides of the 3D model 400 in order to provide a view dependent visual hull.

In FIG. 5 the circle 502 schematically illustrates where viewing angles may be placed around a 3D model 501. The size, i.e. radius, of the circle 502 is generally not important, and should only be construed as where the viewing angles may be placed around the 3D model 501. The skilled addressee realized that the viewing angles may be placed at different distances around and from the 3D model 501 and still realize the inventive concept.

The 3D model 501 shown in FIG. 5 has openings which need to be modeled on the visual hull in order to effectively process the occlusion culling and correctly identify if an object actually occludes another or not. As shown in FIG. 5 the 3D model 501 comprises two openings, i.e. through going holes. In order to accurately model these openings on the visual hull, the viewing angles will be required to be spaced apart with a repetition distance small enough to provide a view through the openings. Accordingly, angular ranges around the existing virtual 3D model in which a viewing angle results in a view through the openings are calculated. For the two openings shown this results in a first angular range $\theta_1$ and a second angular range $\theta_2$. The first angular range $\theta_1$ corresponds to a large repetition distance 503 and the second angular range $\theta_2$ corresponds a small repetition distance 504. Hence, in order to provide a view through the smallest opening the repetition distance is therefore set to at least the small repetition distance 504. Hence, by uniformly distributing a plurality of viewing angles around the original model 501 having a uniform predetermined repetition distance corresponding to the small repetition distance 504 at least one view through the large opening and the small opening is guaranteed. Alternatively, the viewing angles may be spaced more sparsely around the other portions of the 3D model 501 and close enough around the first angular range $\theta_1$ and the second angular range $\theta_2$ to provide a view through those openings such that a more view dependent visual hull is provided.

Further, the size of the voxels in the voxel volume can be configured such that the view through the openings corresponds to at least two voxels. In other words, the size of the voxels is configured such that the width of the smallest opening corresponds to the width of at least two voxels.

Figure 6:
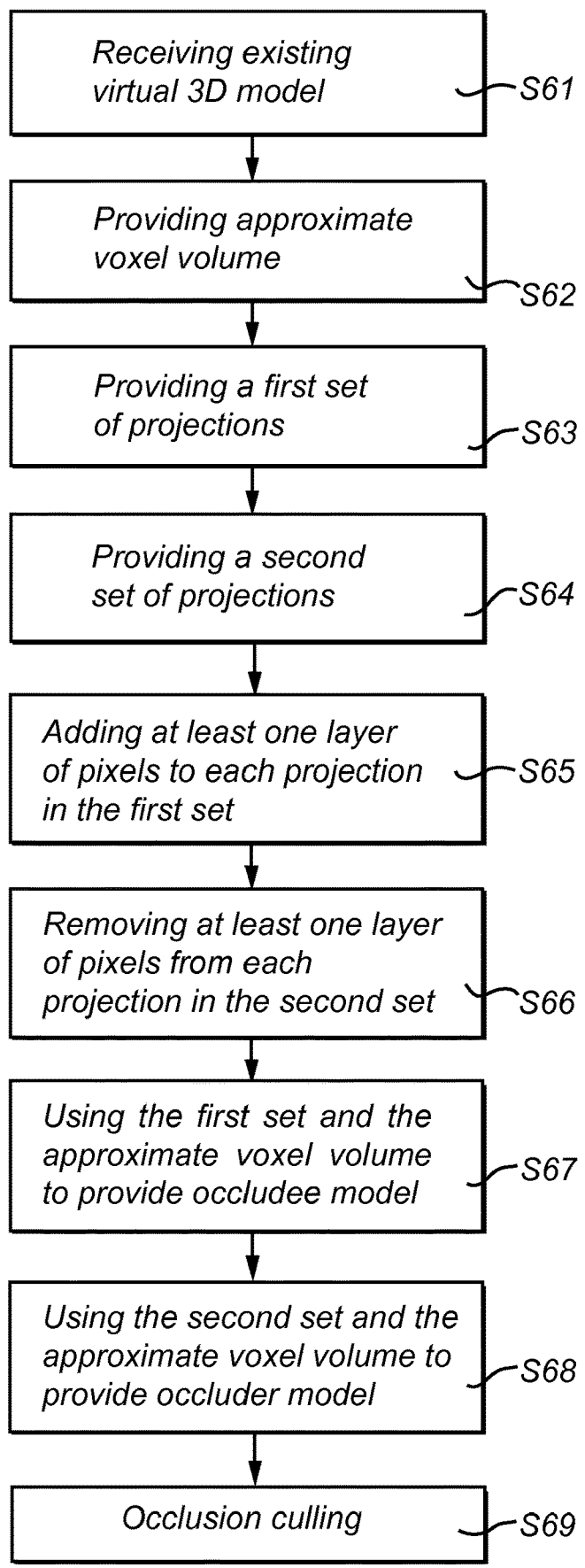
FIG. 6 shows a flowchart of method steps according to an alternative solution using the general inventive concept.

FIG. 6 shows a flowchart of method steps according to an alternative solution of the general inventive concept. The first step S61 comprises receiving an existing virtual 3D model by e.g. the computing device 202. Then visual hull construction is performed under the steps S62-S68, where in the next step S62, an approximate voxel volume is provided.

The approximate voxel volume consists of a plurality of voxels, and the approximate voxel volume fully encloses the existing virtual 3D model which has been received.

The next steps S63 and S64, comprises providing a first respectively a second set of projections of the existing virtual 3D model from a plurality of viewing angles. The projections should be interpreted as the silhouettes, i.e. the 2D projections of the existing virtual 3D model which together with the viewing angles can provide a silhouette cone. The first and second set thus comprises an identical set of projections from the same viewing angles during the steps S63 and S64.

Then, in the next step S65, at least one layer of pixels is added to the outer border of each projection in the first set of projections. The size of each projection in the first set of projections is thus increased by at least one outer layer of pixels.

Similarly, in the next step S66, at least one layer of pixels is removed from the outer border of each projection in the second set of projections. The size of each projection in the second set of projections is thus decreased by at least one outer layer of pixels.

In the next step S67, the first set of projections with an increased size due to the addition of at least one layer of pixels to the outer border and the approximate voxel volume are used to provide a first visual hull of the existing 3D model as an occludee model. The increased size of the projections in the first set of projections will provide larger silhouette cones, which results in less voxels being removed from the plurality of voxels in the approximate voxel volume. Thus, the resulting first visual hull is guaranteed to be larger than the existing virtual 3D model.

In the next step S68, the second set of projections with a decreased size due to the removal of at least one layer of pixels from the outer border and the approximate voxel volume are used to provide a second visual hull of said existing 3D model as an occluder model. The decreased size of the projections in the second set of projections will provide smaller silhouette cones, which results in more voxels being removed from the plurality of voxels in the approximate voxel volume. Thus, the resulting second visual hull is smaller than the existing virtual 3D model.

Finally, in step S69, the occludee model and the occluder model are used during runtime in a 3D virtual environment for occlusion culling.

Hence, the resizing in the alternative solution takes place prior to forming the visual hulls using the first and second set of projections and the viewing angles to form the occluder and occludee model.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps. Additionally, even though the invention has been described with reference to specific exemplifying embodiments thereof, many different alterations, modifications and the like will become apparent for those skilled in the art. Variations to the disclosed embodiments can be understood and effected by the skilled addressee in practicing the claimed invention, from a study of the drawings, the disclosure, and the appended claims. Furthermore, in the claims, the word "comprising" does not exclude other elements or steps, and the indefinite article "a" or "an" does not exclude a plurality.

The invention claimed is:

1. A method for creating simplified representations of an existing virtual three-dimensional (3D) model for use in occlusion culling, said method comprising:
    receiving said existing virtual 3D model, wherein at least one opening of said existing virtual 3D model defines an angular range in which a viewing angle results in a view through the at least one opening;
    performing visual hull construction on said existing virtual 3D model using an approximate voxel volume consisting of a plurality of voxels, said voxel volume fully enclosing said existing virtual 3D model and a set of projections from a plurality of viewing angles to provide a visual hull of said existing 3D model, wherein a predetermined repetition distance of the plurality of viewing angles is selected to provide at least one viewing angle within the angular range;
    increasing or decreasing a volumetric size of said visual hull of said existing 3D model, wherein increasing the volumetric size of said visual hull of said existing 3D model is performed to enable said visual hull of said existing 3D model to envelop said existing virtual 3D model to provide said visual hull as an occludee model, and wherein decreasing the volumetric size of said visual hull of said existing 3D model is performed to enable the said visual hull of said existing 3D model to be enveloped by said existing virtual 3D model to provide said visual hull as an occluder model; and
    using said occludee model or said occluder model during runtime in a 3D virtual environment for occlusion culling.

2. The method according to claim 1, further comprising adding a limited layer of voxels to said visual hull, said limited layer being limited to predetermined portions of said visual hull.

3. The method according to claim 1, further comprising removing a limited layer of voxels to or from said visual hull, said limited layer being limited to predetermined portions of said visual hull.

4. The method according to claim 1, further comprising converting said visual hull into a polygonal mesh representation prior to increasing and decreasing the volumetric size of said visual hull.

5. The method according to claim 4, wherein increasing and decreasing the size of said visual hull comprises resizing the polygon mesh representation of said visual hull.

6. A method according to claim 1, wherein said plurality of viewing angles are uniformly spaced apart by a predetermined repetition distance around the existing virtual 3D model.

7. A system for creating simplified representations of an existing virtual three-dimensional (3D) model for use in occlusion culling, said system comprising:
a memory; and
one or more processors programmed to:
receiving the existing virtual 3D model, wherein at least one opening of said existing virtual 3D model defines an angular range in which a viewing angle results in a view through the at least one opening;
perform visual hull construction on the existing virtual 3D model using an approximate voxel volume consisting of a plurality of voxels, the voxel volume fully enclosing the existing virtual 3D model and a set of projections from a plurality of viewing angles to provide a visual hull of the existing 3D model, wherein a predetermined repetition distance of the plurality of viewing angles is selected to provide at least one viewing angle within the angular range;
increase or decrease a volumetric size of the visual hull of said existing 3D model, wherein increasing the volumetric size of the visual hull of said existing 3D model enables the visual hull of said existing 3D model to envelop the existing virtual 3D model to provide the visual hull as an occludee model, and wherein decreasing the volumetric size of the visual hull of the existing 3D model enables the visual hull of the existing 3D model to be enveloped by the existing virtual 3D model to provide the visual hull as an occluder model; and
use the occludee model or the occluder model during runtime in a 3D virtual environment for occlusion culling.

8. The system of claim 7, wherein the one or more processors are further programmed to add a limited layer of voxels to or from the visual hull, the limited layer being limited to predetermined portions of the visual hull.

9. The system of claim 7, wherein the one or more processors are further programmed to remove a limited layer of voxels to or from the visual hull, the limited layer being limited to predetermined portions of the visual hull.

10. The system of claim 7, wherein the one or more processors are further programmed to convert the visual hull into a polygonal mesh representation prior to increasing and decreasing the volumetric size of the visual hull.

11. The system of claim 10, wherein increasing and decreasing the size of the visual hull comprises resizing the polygon mesh representation of the visual hull.

12. The system of claim 7, wherein the plurality of viewing angles are uniformly spaced apart by a predetermined repetition distance around the existing virtual 3D model.

13. The system of claim 7, wherein increasing the volumetric size of the visual hull comprises adding at least one outer layer of voxels to a first portion of the visual hull to provide the occludee model without adding the at least one outer layer of voxels to a second portion of the visual hull, and wherein decreasing the volumetric size of the existing virtual 3D model comprises removing at least one outer layer of voxels from a third portion of the visual hull to provide the occluder model without removing the at least one outer layer of voxels from a fourth portion of the visual hull.

14. The system of claim 7, wherein a size of the voxels in the voxel volume during a visual hull construction is configured such that a view through at least one opening corresponds to at least two voxels.

15. One or more computer-readable storage device comprising computer-executable instructions for creating simplified representations of an existing virtual three-dimensional (3D) model for use in occlusion culling, the computer-executable instructions causing one or more processors to perform operations comprising:
receiving the existing virtual 3D model, wherein at least one opening of said existing virtual 3D model defines an angular range in which a viewing angle results in a view through the at least one opening;
performing visual hull construction on the existing virtual 3D model using an approximate voxel volume consisting of a plurality of voxels, the voxel volume fully enclosing the existing virtual 3D model and a set of projections from a plurality of viewing angles to provide a visual hull of the existing 3D model, wherein a predetermined repetition distance of the plurality of viewing angles is selected to provide at least one viewing angle within the angular range;
increasing or decreasing a volumetric size of the visual hull of said existing 3D model, wherein increasing the volumetric size of the visual hull of said existing 3D model enables the visual hull of said existing 3D model to envelop the existing virtual 3D model to provide the visual hull as an occludee model, and wherein decreasing the volumetric size of the visual hull of the existing 3D model enables the visual hull of the existing 3D model to be enveloped by the existing virtual 3D model to provide the visual hull as an occluder model; and
using the occludee model or the occluder model during runtime in a 3D virtual environment for occlusion culling.

16. The one or more computer-readable storage device of claim 15, wherein the computer-executable instructions further cause the one or more processors to perform operations comprising adding a limited layer of voxels to or from the visual hull, the limited layer being limited to predetermined portions of the visual hull.

17. The one or more computer-readable storage device of claim 15, wherein the computer-executable instructions further cause the one or more processors to perform operations comprising removing a limited layer of voxels to or from the visual hull, the limited layer being limited to predetermined portions of the visual hull.

18. The one or more computer-readable storage device of claim 15, wherein the computer-executable instructions further cause the one or more processors to perform operations comprising converting the visual hull into a polygonal mesh representation prior to increasing and decreasing the volumetric size of the visual hull.

19. The one or more computer-readable storage device of claim 18, wherein increasing and decreasing the size of the visual hull comprises resizing the polygon mesh representation of the visual hull.

20. The one or more computer-readable storage device of claim 15, wherein the plurality of viewing angles are uniformly spaced apart by a predetermined repetition distance around the existing virtual 3D model.

* * * * *